July 11, 1961

J. R. WINEGARD 2,992,430

TV ANTENNA DRIVEN ELEMENT

Filed Feb. 5, 1958

3 Sheets-Sheet 1

INVENTOR.

John R. Winegard

BY

Frost & Vandenburgh

Attorneys

July 11, 1961 J. R. WINEGARD 2,992,430

TV ANTENNA DRIVEN ELEMENT

Filed Feb. 5, 1958 3 Sheets-Sheet 2

INVENTOR.
John R. Winegard
BY
Frost & Vandenburgh
Attorneys.

July 11, 1961
J. R. WINEGARD
2,992,430
TV ANTENNA DRIVEN ELEMENT
Filed Feb. 5, 1958
3 Sheets-Sheet 3

INVENTOR.
John R. Winegard
BY
Frost & Vandenburgh
Attorneys.

Patented July 11, 1961

2,992,430

TV ANTENNA DRIVEN ELEMENT

John R. Winegard, % Winegard Co., 3000 Scotten Blvd., Burlington, Iowa

Filed Feb. 5, 1958, Ser. No. 713,427
9 Claims. (Cl. 343—814)

My invention relates to an improved driven element for a universal television and F.M. antenna suitable for reception in both the very-high frequency and the ultra-high frequency television band and the frequency modulation band.

Current television frequencies assigned by the Federal Communications Commission are divided between the very-high frequency band—comprising a low frequency portion running from 58 to 88 megacycles and a high frequency portion running from 174 to 216 megacycles—and the ultra-high frequency band which includes a continuous range from 470 megacycles to 890 megacycles. This very wide frequency range of over 10 to 1 as measured from the lowest frequency to the highest frequency imposes severe requirements upon any antenna intended for reception in all of the frequencies.

In accordance with the present invention a driven element for such an antenna is provided which comprises two elements, one effective over a continuous frequency band of approximately 2 to 1 frequency range, such as the ultra-high television frequency band, and one effective outside that band, such as in the very-high television frequency band. Although the two elements of the driven element are coupled together to supply signal to the receiver through a single transmission line, signal is supplied from each of the elements in its own frequency range without significant interference from the other element. Moreover, the ultra high frequency elements are so constructed and arranged that at the low frequency part of the band they operate as efficient half wave units and at the high frequency part of the band they operate as efficient full wave units.

It is therefore a general object of the present invention to provide a driven element for an antenna operable in a continuous frequency band of approximately a 2 to 1 frequency range, such as the ultra-high television frequency band, and in a band, such as the very-high frequency television band, outside that band.

It is another object of the present invention to provide a driven element for an antenna operable efficiently, without substantial impedance variations, and with a substantially uniform directivity pattern in both the very-high frequency and ultra-high frequency television bands.

It is still another object of the present invention to provide a driven element for an antenna composed of a very-high frequency element and an ultra-high frequency element so connected that the very-high frequency element does not disturb operation of the ultra-high frequency element over any portion of the ultra-high frequency band even though the very-high frequency element presents a low and variable impedance at the various frequencies in the ultra-high frequency band.

It is yet another object of the present invention to provide a driven element for an antenna composed of a very-high frequency element and an ultra-high frequency element in which resonant coupling elements serve to isolate the very-high frequency unit at one portion of the ultra-high frequency band and in other portions a change in the voltage distribution of the ultra-high frequency element serves to isolate the very-high frequency element.

Additional objects include the provision of a driven element useful in both the very-high frequency and ultra-high frequency television bands, or in a set of frequencies similarly related, characterized by simplicity, flexibility of construction, uniform impedance and directional characteristics and suitability for incorporation in a highly efficient in-line yagi type antenna.

The novel features which I believe to be characteristic of my invention are set forth with particularity in the appended claims. My invention itself, together with further objects and advantages thereof, will best be understood by reference to the following description taken in conjunction with the accompanying drawings in which:

Figure 11:
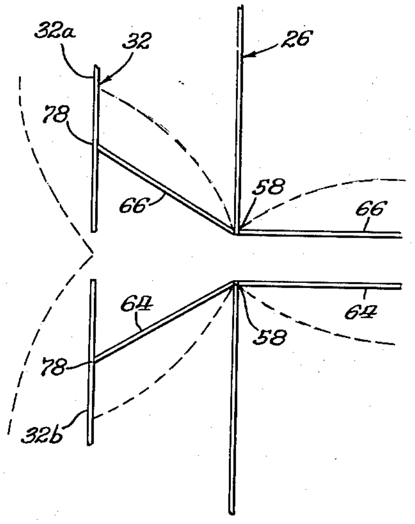
Figure 12:
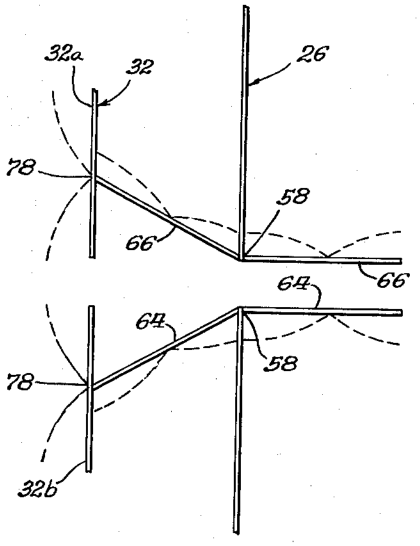

FIGURES 10*a*, 10*b*, 10*c*, and 10*d* are schematic representations of the directivity pattern of the antenna in the frequency range of channels 2 to 6, in the frequency modulation range, in the frequency range of channels 7 to 13, and in the frequency range of channels 14 to 83, respectively;

FIGURE 11 is a somewhat diagrammatic view showing the voltage distribution, in dotted lines, on portions of the driven element of the present invention when operating at the low frequency end of the ultra-high frequency television band; and FIGURE 12 is a view similar to FIGURE 11 showing the voltage distribution when the antenna is operated at the high frequency end of the ultra-high frequency television band.

Figures 1, 2, 5, 7, 8, 9:
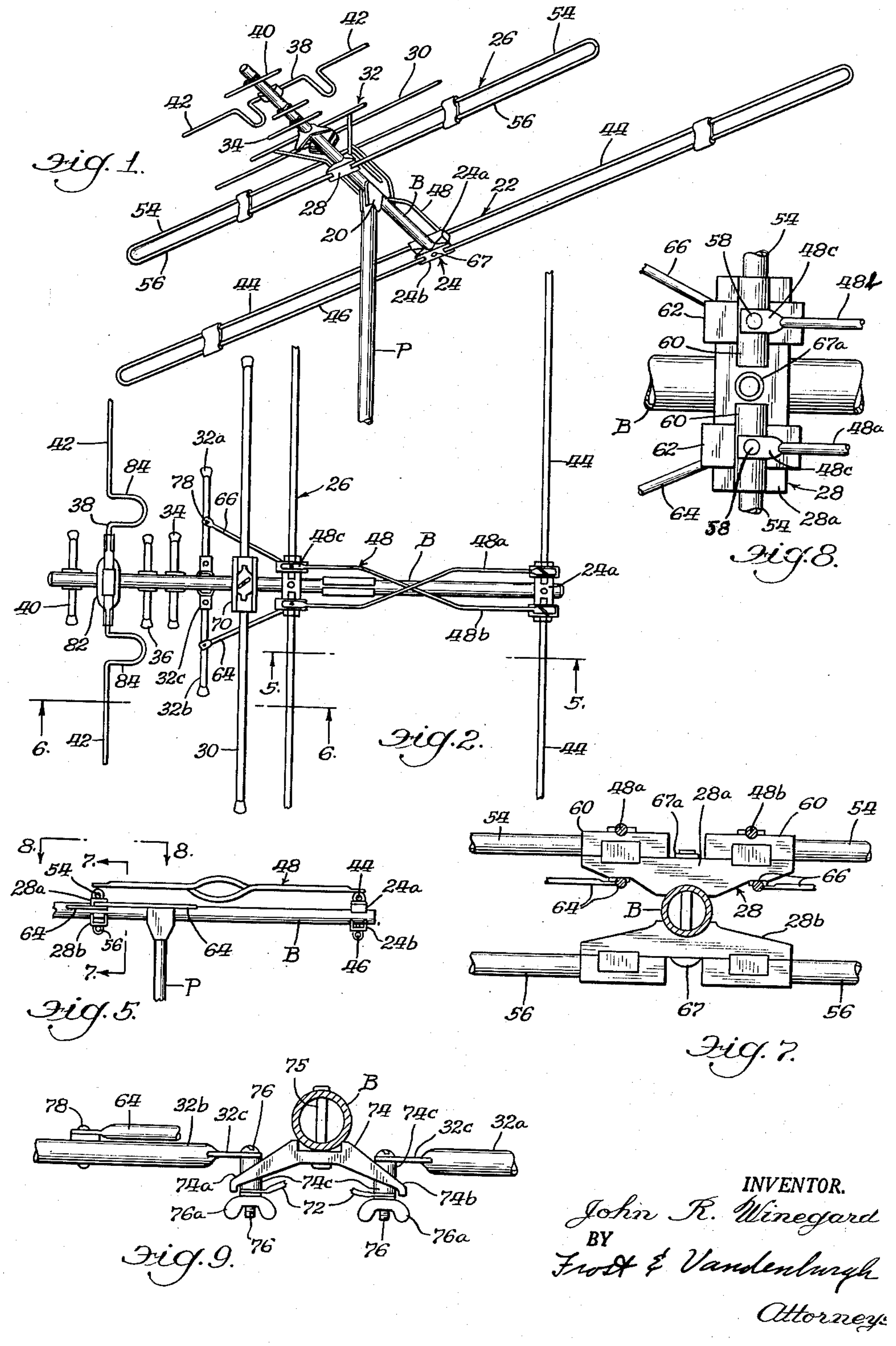
FIGURE 1 is a view in perspective from the under side of a complete antenna having a driven element constructed in accordance with the present invention.
FIGURE 2 is a top plan view with parts broken away of the antenna of FIGURE 1.
FIGURE 5 is a fragmentary view in cross-section through axis 5—5, FIGURE 2.
FIGURE 7 is an enlarged fragmentary cross-section view through axis 7—7, FIGURE 5.
FIGURE 8 is a somewhat enlarged fragmentary view along axis 8—8, FIGURE 5.
FIGURE 9 is a fragmentary cross-section view along axis 9—9, FIGURE 6.

A television antenna which will operate effectively with the driven element of the present invention is disclosed and claimed in my copending patent application, entitled Universal TV and FM Antenna, application No. 713,426, assigned to the same assignee as the present application. A brief description of that antenna is set forth herein as illustrative of one type of antenna in which the driven element claimed herein is effective. As shown in FIGURE 1, the antenna includes a boom B which is horizontally supported by the support post P through the medium of the mounting clamp 20. The support post P is held in erect vertical position by suitable means (not shown). At the aft, or rear, end of the boom B the rear very-high frequency folded dipole, indicated generally at 22, is mounted and is carried on the boom by the support bracket 24. Forwardly of the dipole 22 there is provided a similar, but shorter, dipole 26 which also serves as part of the very-high frequency driven element. This dipole is supported by the bracket 28 as is hereinafter described in detail. Immediately forward of the dipole 26, there is provided a unitary element 30 which is connected on top of the boom B by saddle 70 and serves as a director in the very-high frequency band and as a reflector in the ultra-high frequency band. Immediately forwardly of this element there is provided an ultra-high frequency dipole indicated generally at 32 and described in further detail hereafter. Forwardly of the ultra-high frequency dipole 32 there are provided a series of four ultra-high frequency directors indicated at 34, 36 (FIGURE 2), 38, and 40. The directors 34, 36, and 40 are connected under the boom on saddle 80 while director 38 is connected on top of the boom by saddle 82. A pair of additional elements 42 are located outboard the ends of the director 38.

The long or rear dipole 22 consists of a pair of upper arms 44 which are insulatingly supported from the boom B by the upper insulating portion 24a of the support bracket 24. These arms extend outwardly and are folded back upon themselves to form the spaced parallel portions 46, FIGURE 1, which are affixed at their inboard ends to the conducting lower part 24b of the support bracket 24.

The dipole unit 26 is constructed like the unit 22 except that its dimensions are somewhat shorter than those of the unit 22. That is, the unit 26 includes a pair of top arm members 54 which are supported by the insulating top portion 28a of the saddle assembly 28 and extend outwardly and down to form the parallel lower portions 56 which terminate as shown in FIGURE 7 in the conducting bottom portion 28b of the saddle 28.

The dipoles 22 and 26 are mounted in coplanar aligned relation as shown in FIGURE 1 and are connected together by the transmission line indicated generally at 48. This transmission line is defined by conductors 48a and 48b which are preferably aluminum rod. These conductors terminate in flattened end portions 48c, FIGURE 8, which receive the rivets 58, FIGURE 8. The rivets 58 extend through the support sleeve 60 located at the inboard end of each of the arms defining the dipoles 22 and 26, the snap members 62 which overlay the edges of the support brackets to anchor the arms in operating position, and the insulating support bracket 28a, or 24a (FIGURE 1), as the case may be. In the case of the forward dipole 26, the rivets 58 extend through and make electrical contact with the conductors 64 and 66, FIGURE 7, which define a transmission line as hereinafter described in further detail.

As will be seen from FIGURE 7, the saddle bracket units 24 and 28 each consist of an insulating upper portion, 24a or 28a, and a conducting lower portion 24b or 28b. The anchoring rivet 67 extends through the boom B, the washer 67a, FIGURE 7, and these brackets and is headed at both ends to secure the brackets in straddling clamping relationship to the boom.

The ultra-high frequency dipole 32 is located forwardly of the director 30. This dipole consists of two arms, 32a and 32b, which are removably secured to the insulating support bracket 74. As shown in FIGURE 9, this bracket is secured to the boom B by the lengthy rivet 75 and has ears 74a and 74b extending outwardly and downwardly. Near their ends, these ears define vertical insulating sleeves 74c, which in turn receive the bolts 76 and the thumb nuts, or wingnuts 76a. The inboard ends of arms 32a and 32b terminate in the flattened pads 32c, FIGURES 2 and 9, which have elongated slots (not shown) extending to their sides and adapted to be received under the heads of the bolts 76, FIGURE 9.

Figure 6:
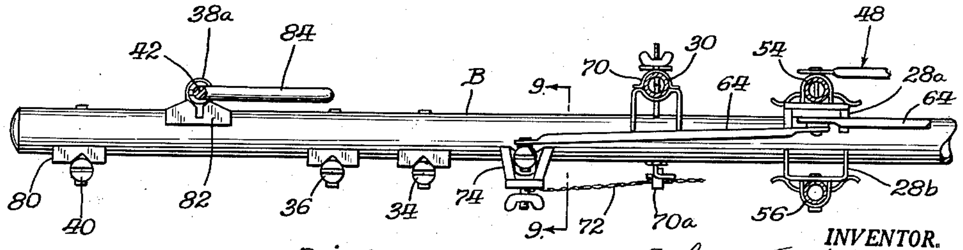
FIGURE 6 is a similar view in cross-section along axis 6—6, FIGURE 2.

The transmission line conductors 64 and 66, FIGURES 2, 6, 7, and 8 are secured to the arms 32b and 32a, respectively, by the rivets 78 at the midpoints of the arms. At their rear ends the conductors 64 and 66 are connected by the rivets 58 to the upper portion 28a of the bracket 28. The length of the transmission line conductors 64 and 66, between the rivets 78 and rivets 58 are such as to define a quarter wave transmission line near the low frequency end of the ultra-high frequency band. Rearwardly of the rivets 58, the transmission line conductors 64 and 66 extend in an amount sufficient to define a quarter wave open transmission line near the low frequency end of the ultra-high frequency band. This construction is shown in FIGURES 1, 5, and 6.

The transmission line leading to the receiver is indicated at 72, FIGURE 6. As shown in this figure, this transmission line is connected to the bolts 76 which in turn define a connection to the inboard end of the ultra-high frequency dipole 32. As shown in FIGURE 6 the transmission line 72 is supported by a clamp 70a.

In an actual antenna construction the following dimensions were used:

| | Inches |
|---|---|
| Longitudinal distance from dipole **22** to dipole **26** | 15 |
| Longitudinal distance from dipole **26** to dipole **32** | 5¼ |
| Overall reach of dipole **22** | 86⅞ |
| Overall reach of dipole **26** | 54 |
| Overall reach of dipole **32** | 13½ |
| Length of each transmission line **64** and **66** between dipole **32** and dipole **26** | 5¾ |
| Length of each transmission line **64** and **66** to the rear of dipole **26** | 5¾ |
| Distance from each end of dipole **32** to transmission lines **64** and **66**, respectively | 3 |
| Diameter of dipole **22** | ⅜ |
| Diameter of dipole **26** | ⅜ |
| Diameter of dipole **32** | ⅜ |
| Diameter of transmission lines **64** and **66** | 3/16 |
| Diameter of transmission lines **48**a and **48**b | 3/16 |

Figure 3:
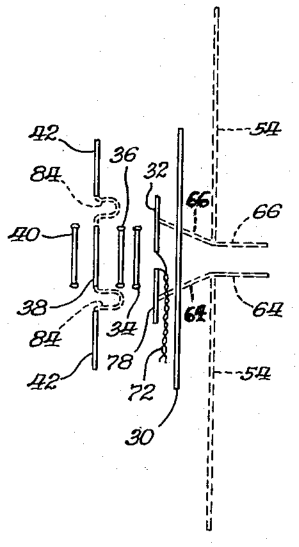
FIGURE 3 is a somewhat diagrammatic view showing the operating elements of the antenna of FIGURES 1 and 2 when operating in the ultra-high frequency band.

The operation of the driven element of the present invention is best understood by reference to FIGURES 3, 4, 11, and 12. In FIGURES 3, 11 and 12 the important elements of the antenna for ultra-high frequency band operation are shown, whereas in FIGURE 4 the important elements for very-high frequency band operation are indicated.

As shown in FIGURE 3, the effective directors for ultra-high frequency band operation are the directors 40, 38, 36, and 34. These are of length to serve as directors and are located forwardly of and in coplanar aligned relationship with the ultra-high frequency dipole driven element 32. The director 30, being of length considerably in excess of the driven element 32, serves as a reflector to increase further the signal level at the driven element 32. In the ultra-high frequency band the director elements 42 have very little effect because they are effectively disconnected by the coupler units 84 from the director portion 38. Since the transmission line 72 is connected directly to the dipole 32, signals at the dipole 32 are transmitted to the transmission line 72 and thence to the receiver.

The transmission line conductors 64 and 66, the dipole elements 54, and other portions of the very high frequency driven elements are shown in dotted lines in FIGURE 3. As described hereafter, these elements are not active with respect to the dipole 32 when the antenna is operating in the ultra-high frequency range. FIGURE 11 shows the voltage distribution in the dipole 32 and the conductor transmission lines 64 and 66 when the antenna is operating at the low frequency end of the ultra-high frequency band. At this frequency a half wave of voltage is present on the dipole with the node in the center of the dipole, or, between the two arms of the dipole. It will be noted that significant voltage is present at the points where the rivets 78 connect the arms 32a and 32b to the transmission lines 66 and 64, respectively. However, at this frequency, the transmission line consisting of conductors 64 and 66 extending rearwardly of the dipole 26 defines an open-end transmission line of one-quarter wave length and consequently has a small impedance at the points of connection to the portions of the conductors 64 and 66 extending forwardly from the dipole 26. The transmission line conductors 64 and 66 extending between the dipole 26 and the dipole 32, since they terminate at their rear ends in a low impedance, act as a closed-end line. Since this portion of the transmission line is also one-quarter wave length in length at the low frequency end of the ultra-high frequency band, the line has a high impedance at the points of connection to the dipole 32. Because of this large impedance the connection of the transmission conductors 64 and 66, which, in turn, are connected to the dipole 26, does not significantly affect the operation of the dipole 32 as a driven element despite the presence of voltage at the points of connection of the conductors 64 and 66. Moreover, since the portions of the transmission line to the rear of the dipole 26 reflect a very low impedance at the low end of the ultra-high frequency band, variations in the impedance of elements 26 and 22 in this band do not affect operation.

FIGURE 12 shows the voltage distribution in the dipole 32 and the transmission line defined by conductors 64 and 66 when the antenna is operated at the high end of the ultra-high frequency television band. Since the frequency at the high end of the band is almost double the frequency at the low end of the band, a full wave of voltage will be present on the dipole 32, and each portion of the transmission line composed of conductors 64 and 66, that is, the portion extending between the dipoles 32 and 26 and the portion extending rearwardly of the dipole 26, will each be approximately one-half wave length in length. It will be noted that at this frequency the voltage nodes on the dipole 32 coincide with the points of connection of the transmission line conductors 64 and 66 to the arms **32*b* and 32*a*, respectively, at the rivets 78. For this reason the connection of the transmission line formed by conductors 64 and 66 has no significant effect on the operation of the dipole 32 as a driven element and that dipole is effectively isolated from the other driven element comprising dipoles 26 and 22** which define the driven element in the very-high frequency band. Variations of impedance of the latter driven element accordingly do not significantly influence the operation of the antenna at the high end of the ultra high frequency band.

At frequencies intermediate the ends of the ultra high frequency band the operation deviates from the theoretical operation described above, but the net effect is to provide antenna operation in which the dipole 32 is only loaded to a very slight degree by transmission line 64—66.

Figures 4, 10A, 10B:
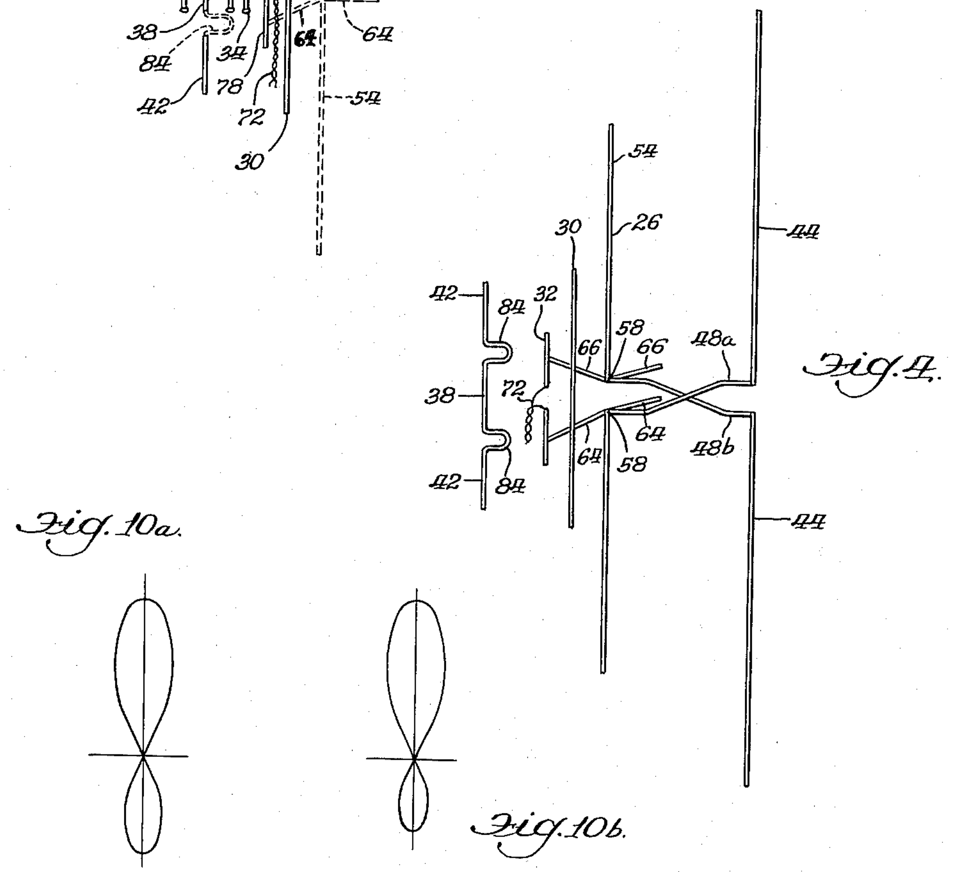
FIGURE 4 is a view like FIGURE 3 but showing the operating elements when operating in the very-high frequency television band.
Figure 10C:
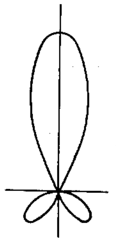
Figure 10D:
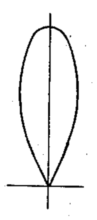

In the very-high frequency band the operation of the antenna is defined by the portions of the structure shown in FIGURE 4. In this instance, the transmission line 72 is connected through the medium of driven element 32 and the transmission line defined by conductors 66 and 64 to the inboard ends of the driven element 54. Since the driven element 32 is of small size in relation to the very-high frequency wave lengths, as is the transmission line defined by conductors 64 and 66, the net effect is the same as if the transmission line 72 were connected directly to the rivets 58. In the very-high frequency band the director 30 is of length to operate effectively as a director to increase the gain of the antenna, particularly at the high frequency end of the very-high frequency band. Similar director action is achieved by the director elements 38 and 42, together with the couplers 84, which provide a unit of electrical length serving to operate as a director in the high frequency end of the very-high frequency band, thereby further increasing the gain.

FIGURES 10*a* to 10*d* inclusive, show approximately the directivity patterns of the antenna throughout its intended operating range. It will be noted that in each instance the major lobe is of about the same configuration—that is with an included angle of about 50 degrees—and is in the same direction in relation to the antenna. Of course there are minor lobes, but in each instance these are of relatively low response and do not interfere with the basic functioning of the major lobe. FIGURES 10*a* to 10*d* are representative of the results of tests made at various frequencies in the indicated ranges, FIGURES 10*a* covering the frequency range of channels 2 to 6, FIGURE 10*b* covering the frequency modulation frequency range, FIGURE 10*c* covering channels 7 to 13, and FIGURE 10*d* covering channels 14 to 83. Experience with the antenna indicates that these are the effective directivity patterns at all frequencies within the indicated ranges, although some variations undoubtedly do occur.

One of the distinctive features of the present invention is that it provides a highly effective driven element for a completely universal antenna suitable for use in areas of medium signal intensity. The antenna has a practical and effective—and constant—directivity pattern throughout the entire high and ultra-high frequency television frequency range, as well as the FM frequency range, and operates effectively whatever the frequencies of the local stations may be.

In the above description, and in the accompanying claims, positions of elements have been described as forward or behind each other in accordance with whether the elements are forward or behind with respect to the direction of the received waves. In the antenna, it will be observed, the response is greatest to incident waves coming from the lefthand direction as seen in FIGURE 2 and waves coming from the opposite direction are received with considerably less gain due to the director action and the reflector action of the various parts as described above.

From the foregoing it will be evident that the antenna of the present invention utilizes two distinct effects to isolate the very high frequency elements from the ultra-high frequency dipole 32. At the low end of the ultra-high frequency band, variations of the impedance of the very high frequency elements do not affect the ultra-high frequency element 32 because the very high frequency elements connect at points 58, FIGURE 8, to a very low impedance point on the transmission line 64—66. At the high end of the ultra-high frequency band the points 58 are not a low impedance point so far as the transmission line 64—66 is concerned, and variations in the impedance of the very high element 22—26 are accordingly reflected at the points of connection of conductors 64 and 66 to the dipole 32. However, this impedance variation is again unimportant because the conductors 64 and 66 are connected to voltage node points of the dipole 32. Because of the isolation achieved in this fashion, the sensitivity of the antenna is preserved in both the very high frequency and ultra-high frequency bands and the desirable directivity patterns above discussed are secured.

While I have shown and described a specific embodiment of the present invention it will, of course, be understood that other modifications and alternative constructions may be used without departing from the true spirit and scope of this invention. I therefore intend by the appended claims to cover all such modifications and alternative constructions as fall within their true spirit and scope.

What I claim as new and desire to secure by Letters Patent of the United States is:

1. A driven element assembly for an antenna operable in both the very high frequency and ultra high frequency TV frequencies, comprising in combination: a dipole having a pair of colinear insulated arms having total reach of substantially a half wave length at the low frequency end of the ultra-high frequency band; a driven element having a feed point and operable in the very-high frequency band; a first transmission line extending from the midpoints of the arms of the dipole, respectively, to the feed point of said driven element, said line being of an odd number of quarter wavelengths in electrical length near the low frequency end of the ultra high frequency band; and a resonant transmission line having low impedance near the low frequency end of the ultra high frequency band connected to the feed point of said driven element, whereby at the lower frequency ranges of the ultra-high frequency band the dipole acts as a half wave unit and the first transmission line reflects a high impedance and at the righer frequency ranges the dipole acts as a full wave unit with the first transmission line connected to the voltage nodes of the arms.

2. In an antenna for use in both the very-high and the ultra-high frequency TV bands, the improvement comprising: a boom; a dipole of approximately half wave length at the low end of the ultra high frequency band insulatingly supported in centered relation to the boom to define feed points close to and straddling the boom; a driven element operable in the very-high frequency band supported by the boom in parallel aligned relation to the dipole and defining feed points close to and straddling the boom; said last feed points being located at a distance of approximately one quarter wave length at the low frequency end of the ultra high frequency band from the first feed points; conductors connecting at approximately the midpoints of the arms of the dipole to the last feed points, respectively; and, an open end stub transmission line of approximately one quarter wave length at the low frequency end of the ultra-high frequency band connected to the last feed points.

3. In an antenna for use in both the very-high frequency and the ultra-high frequency TV bands, the improvement comprising: a boom; a dipole of approximately half wave length at the low end of the ultra-high frequency band insulatingly supported in centered relation to the boom to define feed points close to and straddling the boom; a driven element operable in the very-high frequency band supporting the boom in parallel aligned relation to the dipole and defining feed points close to and straddling the boom, said last feed points being located at a distance from the first feed points of approximately one quarter wave length at the low frequency end of the ultra-high frequency band from the first feed points; and conductors connecting approximately the midpoints of the arms of the dipole to the last feed points, respectively, said conductors extending in converging relation from the dipole to the last feed points and in substantially parallel relation to each other and to the boom for approximately an equal distance beyond the last feed points.

4. In an antenna for use in both the very high frequency and the ultra-high frequency TV bands, the improvement comprising: a boom; a first dipole of substantially half wave length at the low end of the ultra high frequency band insulatingly supported in centered relation to the boom to define transmission line feed points close to and straddling the boom; a driven element operable in the very high frequency band, said driven element being defined by a comparatively long second dipole straddling the boom in parallel aligned relation to the first dipole, a shorter third dipole interposed between the first dipole and the second dipole, and in parallel aligned relationship thereto, and a transmission line connecting the second and third dipoles to define feed points at the third dipole straddling the boom, said last feed points being located at a distance from the first feed point of approximately one-quarter wave length at the low frequency end of the ultra high frequency band; and conductors connecting approximately the midpoints of the arms of the first dipole to the last feed points, respectively, said conductors extending in converging relation from the first dipole to the last feed points and in substantially parallel relation to each other and to the boom for approximately an equal distance beyond the last feed points.

5. In an antenna for use in both the very high frequency and the ultra high frequency TV bands, the improvement comprising: a boom; a first dipole of substantially half wave length at the low end of the ultra high frequency band insulatingly supported in centered relation to the boom and on the under side thereof to define feed points close to and straddling the boom; a driven element operable in the very high frequency band, said driven element being defined by a comparatively long second dipole straddling the boom in parallel aligned relation to the first dipole and defining feed points disposed above the boom, a shorter third dipole interposed between the first dipole and the second dipole and in parallel aligned relationship thereto and defining feed points above the boom, and a transmission line above the boom connecting the second dipole to the third to define feed points at the third dipole straddling the boom, said last feed points being located at a distance of approximately one half wave length at the low frequency end of the ultra high frequency band from the first feed points; and conductors in substantial vertical alignment with the boom connecting approximately the midpoints of the arms of the dipole to the last feed points, respectively, said conductors extending in converging relation from the dipole to the last feed points; and means defining a resonant transmission line having low impedance at the low end of the ultra high frequency band and connected to the last feed points.

6. In combination: a VHF television antenna defining a pair of feed points; a dipole having arms of length to resonate as a half wave antenna at the low frequency end of the UHF television band, and hence operable to resonate as a full wave antenna at the high frequency end of the UHF band, said dipole being adapted to receive a transmission line connected to the arms, respectively; conductors connecting the midpoints of the arms of the dipole to the feed points of the VHF antenna, said conductors defining a transmission line of substantially an odd multiple of a quarter wave length at the low frequency end of the UHF band; and a resonant element connected to the feed points of the VHF antenna and defining a low impedance at the low frequency end of the UHF band.

7. In combination: a VHF television antenna defining a pair of feed points; a dipole having arms of length to resonate as a half wave antenna at the low frequency end of the UHF television band, and hence operable to resonate as a full wave antenna at the high frequency end of the UHF band; conductors connecting the midpoints of the arms of the dipole to the feed points of the VHF antenna, said conductors defining a transmission line reflecting a high impedance at said midpoints at the low frequency end of the UHF band and defining low impedance points at the low frequency end of the UHF band; and means connecting the feed points of the VHF antenna to said low impedance points.

8. A driven element assembly for an antenna operable in both the very high frequency and ultra high frequency TV frequencies, comprising in combination: a dipole having a pair of colinear insulated arms having total reach of substantially a half wave length at the low frequency end of the ultra high frequency band; a driven element having a pair of spaced feed terminals and of size to operate in the very high frequency band; a transmission line extending from the midpoints of the arms of the dipole, respectively, to the feed terminals of said driven element, respectively, said line being of an odd number of quarter wave lengths in electrical length near the low frequency end of the ultra high frequency band; and resonant elements connected to said terminals having a low impedance near the low frequency end of the ultra high frequency band, whereby at the lower frequency ranges of the ultra high frequency band the dipole acts as a half wave unit and the transmission line reflects a high impedance and at the higher frequency ranges the dipole acts as a full wave unit with the transmission line connected to the voltage nodes of the arms.

9. A driven element assembly for an antenna operable in both the very high frequency and ultra high frequency TV frequencies, comprising in combination: an altra high frequency element having colinear arms with total reach of substantially a half wave length at the low frequency end of the ultra high frequency band; a driven element having a pair of spaced feed terminals and of size to operate in the very high frequency band; a first transmission line extending from the midpoints of the arms, respectively, to the feed terminals of said driven element, respectively, said line being of an odd number of quarter wave lengths in electrical length near the low frequency end of the ultra high frequency band; and resonant elements connected to said terminals having a low impedance near the low frequency end of the ultra high frequency band, whereby at the lower frequency ranges of the ultra high frequency band the ultra high frequency element acts as a half wave unit and the transmission line reflects a high impedance and at the higher frequency ranges the ultra high frequency element acts as a full wave unit with the transmission line connected to the voltage nodes of the arms.

References Cited in the file of this patent

UNITED STATES PATENTS

| | | |
|---|---|---|
| 2,700,105 | Winegard | Jan. 18, 1955 |
| 2,772,413 | Guernsey et al. | Nov. 27, 1956 |

FOREIGN PATENTS

| | | |
|---|---|---|
| 806,761 | France | Dec. 24, 1936 |

OTHER REFERENCES

Antennas, by Kraus, McGraw-Hill Book Company, Inc., 1950, pages 418–419.